(12) United States Patent
Rodriguez-Vilches et al.

(10) Patent No.: US 12,264,083 B2
(45) Date of Patent: Apr. 1, 2025

(54) WATER TREATMENT SYSTEM AND METHOD FOR TREATMENT OF WATER

(71) Applicant: ABB Schweiz AG, Baden (CH)

(72) Inventors: Seila Rodriguez-Vilches, Thalwil (CH); Frank Kassubek, Rheinfelden (DE)

(73) Assignee: ABB Schweiz AG, Baden (CH)

( * ) Notice: Subject to any disclaimer, the term of this patent is extended or adjusted under 35 U.S.C. 154(b) by 579 days.

(21) Appl. No.: 17/298,153

(22) PCT Filed: Dec. 13, 2019

(86) PCT No.: PCT/EP2019/085165
§ 371 (c)(1),
(2) Date: May 28, 2021

(87) PCT Pub. No.: WO2020/120767
PCT Pub. Date: Jun. 18, 2020

(65) Prior Publication Data
US 2022/0112096 A1    Apr. 14, 2022

(30) Foreign Application Priority Data
Dec. 14, 2018    (EP) .................................... 18212647

(51) Int. Cl.
*C02F 1/00*    (2023.01)
*C02F 103/00*    (2006.01)

(52) U.S. Cl.
CPC ........ *C02F 1/008* (2013.01); *C02F 2103/008* (2013.01); *C02F 2201/00* (2013.01); *C02F 2209/005* (2013.01); *C02F 2209/36* (2013.01)

(58) Field of Classification Search
None
See application file for complete search history.

(56) References Cited

U.S. PATENT DOCUMENTS

| | | | |
|---|---|---|---|
| 2005/0139530 A1* | 6/2005 | Heiss | C02F 9/00 210/257.2 |
| 2010/0116647 A1 | 5/2010 | Kornmuller et al. | |

(Continued)

FOREIGN PATENT DOCUMENTS

| | | |
|---|---|---|
| CN | 101531410 A | 9/2009 |
| CN | 101786748 A | 7/2010 |

(Continued)

OTHER PUBLICATIONS

Wang Qi, et al.; Prediction of ballast water for the microbial indicators based ongenetic algorithm and artificial neural network; Journal of Jiangsu University of Science and Technology; vol. 30 No. 6; Dec. 2016; 9 Pages.

(Continued)

*Primary Examiner* — Richard C Gurtowski
(74) *Attorney, Agent, or Firm* — Whitmyer IP Group LLC

(57) ABSTRACT

A system for marine growth prevention including a water transport line, configured to transport water through the system, an online multi-sensor module being connected to the water transport line in an online manner and being configured to automatically analyze the water being transported through the water transport line, thereby obtaining one or more of water parameters indicative of properties of organisms in the water, a hybrid treatment module configured to treat the water by executing multiple treatment modes, and a control system configured to regulate the hybrid treatment module according to the one or more water parameters received from the online multi-sensor module.

18 Claims, 4 Drawing Sheets

(56) References Cited

U.S. PATENT DOCUMENTS

| | | | |
|---|---|---|---|
| 2010/0332149 A1* | 12/2010 | Scholpp | C02F 1/008 |
| | | | 702/188 |
| 2014/0224714 A1 | 8/2014 | Palmer et al. | |
| 2014/0229414 A1 | 8/2014 | Goldberg et al. | |
| 2017/0057833 A1 | 3/2017 | Palmer et al. | |

FOREIGN PATENT DOCUMENTS

| | | |
|---|---|---|
| CN | 102642960 A | 8/2012 |
| CN | 202717658 U | 2/2013 |
| CN | 104030504 A | 9/2014 |
| CN | 104673665 A | 6/2015 |
| CN | 105246837 A | 1/2016 |
| DE | 102006045558 A1 | 4/2008 |
| GB | 2514609 A | 12/2014 |
| JP | 2012217966 A | 11/2012 |
| WO | 2013075219 A1 | 5/2013 |

OTHER PUBLICATIONS

Chen Ning, et al.; Development and Application of Ship Ballast Water Management System; Shanghai Science and Technology Press; Apr. 30, 2022; 10 pages.

Extended European Search Report; Application No. 18212647.4; Completed: Apr. 12, 2019; Issued: Apr. 24, 2019; 6 Pages.

International Search Report and Written Opinion of the International Searching Authority; Application No. PCT/EP2019/085165; Completed: Jan. 24, 2020; Mailing Date: Feb. 3, 2020; 14 Pages.

Proceedings of Pearl River Delta Area Maritime Safety Forum2009; Prepared by the Organizing Committee of the Pearl River Estuary Maritime Safety Forum; Dalian Maritime University Press; 6 pages.

Chen Ning, et al.; Development and Application of Ship Ballast Water Management System; Shanghai Science and Technology Press; Apr. 30, 2022; 8 pages.

Chinese Office Action and Search Report; Application No. 2019800820622; Completed: Aug. 8, 2022; 17 Pages.

* cited by examiner

WATER TREATMENT SYSTEM AND METHOD FOR TREATMENT OF WATER

TECHNICAL FIELD

The present invention relates to systems and methods for water treatment, e.g. for marine growth prevention. In particular, the present invention relates to ballast water treatment systems and methods. More particularly, the present invention relates to systems and methods for the depletion of ballast water components.

BACKGROUND

Ships use seawater for several purposes—e.g. as ballast, for cooling, for cleaning. In many cases, the seawater containing marine organisms, has to be treated before use or discharge to prevent these organisms to grow in unwanted places (either within the ship or the sea). This is especially true for ballast water (which we include in marine growth prevention here) where strict legal regulations have been imposed on the amount and type of organisms that can be discharged: For travelling in a partially loaded or unloaded state, a cargo ship is typically equipped with one or more water tanks. In a watergoing vessel, the water tanks are filled with seawater (saline water) i.e. ballast water at a first location which contributes to stabilization. The ship travels to a second location and discharges the ballast water.

Ballast water from the first location may contain biological species such as algae and oceanic plankton that are biologically invasive (i.e. introduced species) at the second location. Thus, it is legally required that ballast water is treated, or disinfected, before its discharge. A typical ballast water treatment process involves a filtration stage (a physical separation stage) and a disinfection stage. In the filtration stage, typically, solids having a particle size of >50 µm are removed. Examples for a filtration stage include backwashable mesh or disk filters, hydrocyclones or the like. Living organisms below these dimensions remain to be treated by the disinfection stage.

Most commonly, the disinfection stage involves an ultraviolet (UV) treatment method or an electro-chlorination method. Regulations in some countries require that organisms released in a ballast water discharging process are actually dead; however, UV treatment is known to leave some organisms in a living, but non-viable stage. As the UV treatment mainly damages the DNA of organisms, it can render them non-reproductive. However, to actually kill the organisms, very high doses of UV are necessary, which leads to large energy consumption and reduces the treatment capacity of a UV-based disinfection stage. Some UV-based disinfection stage treatment methods involve a first disinfection process during charging the ballast water into the ballast water tanks, and a second disinfection process during the ballast water discharge, which makes this approach time consuming.

Electro-chlorination is an electrolytic process that needs a branch path, or side-stream path, branching off from the main ballast water stream. Electrolysis in saline water generates free chlorine that is an active oxidative species. The electrolyzed branched-off water is injected into the main ballast water, wherein the free chlorine and/or chlorine compounds generated therefrom disrupt the outer membrane of the living organisms inside the ballast water stream. However, free chlorine as well as some chlorine compounds are known to have long lifetime; thus, such substances have to be neutralized or removed prior to discharging the treated water into the sea. Also, electrolysis is non-functional in brackish water or fresh water or only difficult to establish by adding salt to the treatment. Also, the level of salinity of the treated water directly affects the chlorine production. Moreover, electrolysis involves a production of hydrogen as a by-product, which may lead to security risks.

Furthermore, ballast water contains diverse amount of natural organic substances that, depending on local conditions, may be oxidized to disinfection by-products (DBP) (such as trihalomethanes or brominated compounds) during the disinfection process. In fact, these DBP might be harmful to aquatic animals and humans due to their potential carcinogenic and mutagenic effects. By legal regulations, these by-products or active substances are not allowed in the discharged ballast water. The DBPs normally require neutralization of the ballast water during or prior to discharge of the ballast water. Hence, overdosing of active substances requires neutralization which further increases the costs and the time consumed for the ballast water treatment.

In addition, legal standards require quantification of organisms in ballast water which in turn requires the development of viability (i.e. number and differentiation between death and living organisms) assessment protocols. Staining methods such as FDA/CMFDA (Fluorescein diacetate+5-chloromethylfluorescein diacetate) are well stablished to assess viability of (micro-) organisms. Such methods are, however, time consuming and require trained personnel to be performed properly. Similar issues also arise in other situations in which marine growth prevention in water is desired.

In light of the above, there is a need for an improved treatment approach of ballast water at different stages of treatment that includes and considers many influencing factors.

SUMMARY

According to an aspect, a water treatment system for marine growth prevention is provided. The water treatment system comprises: A water transport line, configured to transport water through the system; an online multi-sensor module being connected to the water transport line in an online manner and being configured to automatically analyze the water being transported through the water transport line, thereby obtaining one or more water parameters indicative of properties of organisms in the water; a hybrid treatment module configured to treat the water by executing multiple treatment modes; and a control system configured to regulate the hybrid treatment module according to the one or more water parameters received from the online multi-sensor module by determining respective treatment parameters for the multiple treatment modes and issuing a control signal including the treatment modes and the treatment parameters determined.

In a further aspect, a water treatment system may include a water transport line, configured to transport water through the system, an online multi-sensor module being connected to the water transport line in an online manner and being configured to automatically analyze the water being transported through the water transport line, thereby obtaining one or more water parameters indicative of properties of organisms in the water, a hybrid treatment module configured to treat the water by to executing multiple treatment modes, and a control system configured to regulate the hybrid treatment module according to the one or more water parameters received from the online multi-sensor module.

According to a further aspect, a method for marine growth prevention. The method includes transporting water through a water transport line, automatically analyzing the water being transported through the water transport line at an online multi-sensor module being connected to the water transport line in an online manner, thereby obtaining one or more water parameters indicative of properties of organisms in the water, treating the water at a hybrid treatment module by executing multiple treatment modes; and regulating the hybrid treatment module by a control system according to the one or more water parameters received from the online multi-sensor module.

BRIEF DESCRIPTION OF THE DRAWINGS

The subject matter of the invention will be explained in more detail in the following text with reference to preferred exemplary embodiments which are illustrated in the drawings, in which.

DETAILED DESCRIPTION

In water treatment for marine growth prevention, the required treatment dosage e.g. amount of active species, UV, chlorine or ozone for disinfection may depend on the (micro-) organisms contained in the water as well as on their physiological state. In addition, water parameters such as salinity, turbidity, organic compound content or even temperature affect the efficiency of the treatment. Typically, only the dosage is adapted which often leads to overdosing with large costs. Therefore, e.g., ballast water treatment systems so far have high running costs, including power consumption, maintenance and repairs and the like. In the following, embodiments of the water treatment system are described. The description is given for a ballast water treatment, but it is equally applicable to any other water treatment system for marine growth prevention, and in particular for any seawater treatment system.

According to embodiments described herein, a water treatment system for marine growth prevention is provided. For instance, the water treatment system according to embodiments described herein, may be a system to be used in ships, more particularly in e.g. cargo ships for the depletion of water-related organisms and other substances as well as disinfection. Thus, the system can be a seawater treatment system and in particular a ballast water treatment system. The system may particularly be useful in the reduction of disinfection by-products, in the elimination of neutralization, in the reduction of costs as well as in the increase of efficiency and in the reduction of treatment time.

According to embodiments described herein, the water treatment system for marine growth prevention includes a ballast water transport line, configured to transport ballast water through the system, an online multi-sensor module being connected to the ballast water transport line in an online manner and being configured to automatically analyze the ballast water being transported through the ballast water transport line, thereby obtaining one or more of water parameters indicative of properties of organisms in the ballast water, a hybrid treatment module configured to treat the ballast water by executing multiple treatment modes, and a control system configured to regulate the hybrid treatment module according to the one or more water parameters received from the online multi-sensor module.

According to embodiments described herein, a ballast water treatment system is provided. The ballast water treatment system combines several advantages over the systems known in the art. For example, the ballast water treatment system provided herein, depicts a fast, simple and automated way for an optimized and controlled treatment of ballast water in order to achieve a highly efficient treatment while energy levels are decreased and high costs are saved. Additionally, neutralization of disinfection by-products can be avoided.

Figure 1:
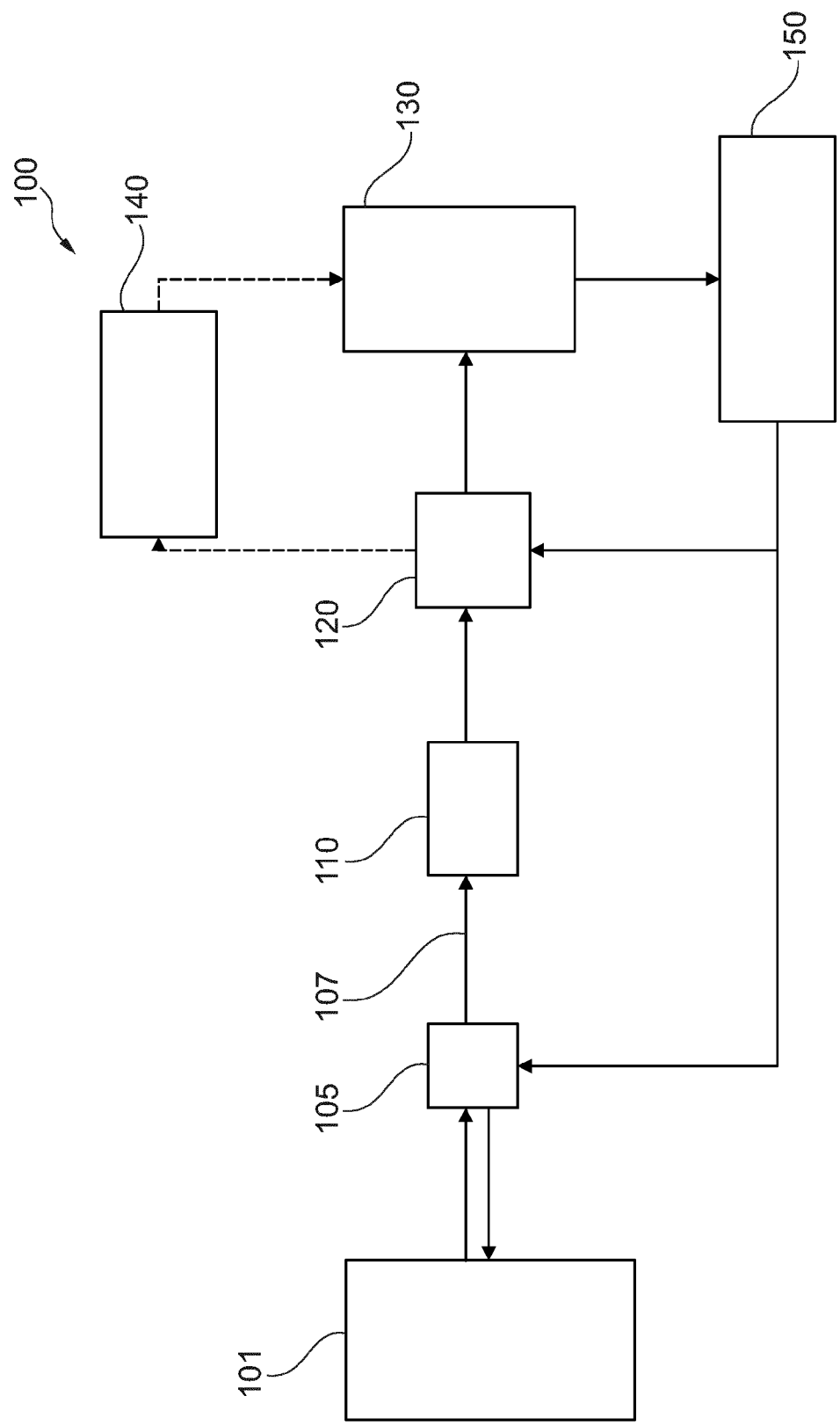
FIG. 1 shows a schematic view of a water treatment system for marine growth prevention according to embodiments described herein.

FIG. 1 shows a schematic view of a ballast water treatment system according to embodiments described herein. The ballast water may be introduced into the system from an outside of the system 101. The outside of the system may be a ballast water source like e.g. the sea, lakes, or other common water reservoirs. The ballast water may be transported into the system by the use of a pumping device 105 as a ballast water stream. The ballast water may be transported via a ballast water transport line 107. The ballast water transport line may be a hollow tubing. The transport line may connect single components of the ballast water treatment system and may provide the ballast water through the system. The ballast water transport line may be a looped line.

According to embodiments, the pumping device 105 may be configured to pump the ballast water through the ballast water treatment system. The pumping device 105 may be a pump, for example a centrifugal pump. According to embodiments, further pumping devices for transporting the ballast water through the ballast water treatment system may be arranged throughout the ballast water treatment system.

According to embodiments, the ballast water stream may be optionally transported to a physical separation device 110, e.g. a filtering module. The filtering module may include one or more filters e.g. filter cassettes for removing larger debris from the ballast water stream. The filtering module i.e. the one or more filters may provide a pore size small enough for preventing suspended solids e.g. wood, plastic and the like as well as (larger) marine organisms in the ballast water from being passed on through the system but may provide a pore size big enough for allowing smaller ballast water components e.g. algae, small organisms and the like to pass. For example, solids having a particle size of >50 μm may be removed. Living organisms below these dimensions may remain in the ballast water.

According to embodiments described herein, the ballast water stream is transported via the ballast water transport line 107 to an online multi-sensor module 120. According to an aspect, the multi-sensor module may be provided in direct fluid communication with the ballast water stream (e.g., as opposed to an offline measurement which is not in direct fluid communication). According to another aspect, the online multi-sensor module 120 may be provided upstream or downstream of the hybrid treatment module along the ballast water transport line. Thus, a direct measurement of several water parameters, of the ballast water being currently transported in the ballast water transport line, may be ensured. The one or more water parameters indicative of properties of organisms in the ballast water may be selected from the group consisting of identity of organisms, quantity of organisms, viability of organisms and a physiological health parameter of organisms comprising a physiological health status of organisms or combinations thereof.

According to an aspect, one or more other water parameters or ballast water quality parameters may be measured, especially relating to the untreated water. The one or more ballast water quality parameters may be selected from the group consisting of pH, turbidity, salinity, temperature, conductivity, total residual oxidants (TRO), total organic carbon (TCO), particulate organic matter (POM), dissolved organic matter (DOM), mineral matter (MM) or combinations thereof. Ballast water quality parameters may also include any parameters that relate to the chemical properties of the ballast water. Advantageously, by measuring the ballast water quality parameters, a treatment strategy as further described below may be optimized. The ballast water quality parameters may for example interfere with the measurements and distort the measured values of other parameters like e.g. the measurement of organisms. By identifying and quantifying the ballast water quality parameters, it is possible to calculate the true measurement values e.g. by the use of the control system. Accordingly, the treatment may be further optimized.

Further advantageously, by measuring the one or more ballast water quality parameters the efficiency of the treatment process may be increased or optimized. The efficiency of the treatment varies with the physical parameters and chemical composition of the ballast water. For example, active species like ozone may react with bromide in the ballast water, thereby forming disinfecting compounds containing bromide—the mechanism of action hence depends on the bromide concentration. Accordingly, the treatment process may be beneficially adapted and optimized when measuring or analyzing the ballast water quality parameters. In particular, adjustment of treatment parameters may be facilitated and may be set more accurately.

The term "organisms" as used herein may relate to organisms that are present in the ballast water stream and may include living and/or dead organisms. Examples may include phytoplankton, zooplankton, microorganisms and other water-related organisms. This may also include algae and other organisms that carry out photosynthesis. The term "organism" may also be understood as a single cell or a cell cluster.

According to embodiments, an online multi-sensor module 120 is provided. The online multi-sensor module 120 may include a plurality of sensors 122 for automatically analyzing the ballast water, thereby obtaining one or more water parameters indicative of properties of organisms in the water. The online multi-sensor module may measure parameters of the water. The online multi-sensor module is especially configured to automatically analyze the water upstream of the treatment module, thereby obtaining one or more water parameters indicative of properties of organisms in the untreated water. The measured parameters may be forwarded to a control system 140 e.g. as information about the one or more water parameters. The online multi-sensor module may be configured to automatically analyze at least one physiological parameter of organisms in the ballast water.

The online multi-sensor module may be configured to perform fluorescence-based methods. The online multi-sensor module may be configured to identify and quantify organisms present in the ballast water stream. At least one of the sensors 122 may be a sensor for analyzing organisms present in the ballast water stream. For example, the sensor for analyzing organisms may be a flow cytometer. In particular, the multi-sensor module may be configured to analyze the physiological health status of the organisms. More particularly, the multi-sensor module may be configured to analyze the physiological health status of the organisms by fluorescence-based methods.

The term "automatically" as used herein may be understood as an automated way of starting the analysis of the ballast water. For example, the one or more sensors may start measurements once the ballast water is transported along the one or more sensors. Additionally or alternatively, the term "automatically" may be understood as an automated way of analyzing the ballast water in the sense that the measurements are carried out in an automated way without the requirement for manual analysis.

The term "physiological parameter" as used herein may be understood as a parameter that is related to a physiological characteristic of an organism. Generally, a physiological parameter is related to functions and mechanisms which work within a living system. As such, any parameter that is related to a function or to a mechanism in an organism may be included. For example, parameters related to photosynthesis like e.g. chlorophyll content, chlorophyll fluorescence and gas exchange may fall within this definition.

According to embodiments described herein, the online multi-sensor module 120 may generate data. The data may be forwarded to a control system. In particular, the online multi-sensor module may generate current data or real-time data. The data may include measurement data. The online multi-sensor module may be configured to provide current data to a control system, in particular to provide real-time data.

According to embodiments described herein, organisms may be analyzed. In particular, a physiological heath status of the organisms may be analyzed. Fluorescence-based methods i.e. fluorescence measurements may be used for such analysis. Different methods may be used to analyze the physiological health status of the organisms contained in the ballast water like e.g. fluorometry, flow cytometry and the like. For example, a PAM (pulse amplitude modulated) fluorometer may be used for measuring a fluorescence or devices for the measurement of the so-called OJIP parameters of the fluorescence curve.

According to embodiments, the physiological health status of the organisms contained in the ballast water like e.g. microorganisms and algae, may influence the treatment of the organisms. The "physiological health status" as used herein may be understood as the health state an organism or cell is situated. For example, the health status of cells may vary according to stress factors the cells are exposed to. As further described below, the physiological health status of the cells may impact the responsiveness of the cells to different treatments. As a rule of thumb, the better the physiological health status of a cell or organism, the less treatment or treatment intensity is required for disinfection. The treatment intensity may be varied by varying the treatment dosage, the treatment time and/or other treatment-related factors.

Advantageously, if the physiological health status is known, the treatment of the ballast water may be adapted accordingly. Thus, this allows for adapting a treatment strategy according to the physiological health status, providing a directed and improved treatment. The optimized treatment may lead to an increase in treatment efficiency and a decrease of costs and treatment time since it is possible to fine tune the treatment according to the specific organisms and their respective physiological health status. This may also prevent overdosing of treatment and may lead to a reduction of disinfection by-products.

According to embodiments described herein, a control system 140 is provided. The control system may be configured to regulate a hybrid treatment module according to data received from the multi-sensor module. In other words, the control system 140 may be used to regulate a treatment provided by the hybrid treatment module with the information acquired by the multi-sensor module. Additionally or alternatively, the control system may be configured to determine and provide treatment parameters for the multiple treatment modes according to the water parameters received from the multi-sensor module and/or according to external data. In other words, the control system may be configured to determine and provide treatment parameters for multiple treatment modes, thereby regulating at least one treatment device of the hybrid treatment module. Taking into account the water parameters, an optimal treatment strategy may be determined by the control system. The control system 140 may receive data or information from the online multi-sensor module 120. The data or information may include the measurement results from the online multi-sensor module, in particular, from the one or more sensors. The control system may be configured to process the data received.

The term "information" (also referred to herein as data) may in particular include one or more input signals that are acquired and/or one or more output signals being issued based on the data acquired. For example, this may include raw data obtained from or acquired by the online multi-sensor module. The raw data may also be current data. Additionally or alternatively, this may include processed data, e.g. analyzed data or combined data from different measurements. For example, processed data may also include the treatment strategy and/or the multiple treatment modes. Furthermore, the data may also be processed in the sense that a program for the execution of multiple treatment modes may be provided. For example, such program may be executed by the hybrid treatment module 130.

Additionally or alternatively, the control system 140 may provide commands for activating a selected subset of the multiple treatment modes, the subset being selected according to the one or more water parameters received from the online multi-sensor module. The control system 140 may provide these commands in addition to the treatment parameters. The control system 140 may provide commands for activating a selected subset of the plurality of treatment devices, the subset being selected according to the one or more water parameters received from the online multi-sensor module. The treatment parameters may include the commands for activating a selected subset of the plurality of treatment devices.

The control system 140 may include a computer, at least one processor and for example at least one memory in order to (technically) process the data, for example electronically and/or optically. A computer can be a device which is generally thought of as such, for example desktop PCs, notebooks, netbooks, etc., but can also be any programmable apparatus, such as for example a mobile phone or an embedded processor. The term "computer" includes a cloud computer, for example a cloud server. The cloud computer can function as a virtual host for an operating system and/or data processing application which is used to execute the programs provided.

According to embodiments, the computer can be a data processing device including means for executing the computer program elements and/or programs provided, for example a data processing device including a digital processor (central processing unit or CPU) which executes the computer program elements, and optionally a volatile memory (for example a random-access memory or RAM) for storing data used for and/or produced by executing the computer program elements.

The computer for example may include interfaces in order to receive and/or output data and/or perform an analogue-to-digital conversion. The data are for example data which represent physical, chemical and/or physiological properties and/or which are generated from technical signals. The technical signals are for example generated by means of (technical) detection devices i.e. by the multi-sensor module i.e. the one or more sensors. The technical signals may for example be electrical or optical signals. The technical signals for example represent the data received and/or outputted by the computer. The computer may be particularly operatively coupled to a display device which allows information outputted by the computer to be displayed, for example to a user.

According to embodiments, the computer may output a control signal issued based on the data received. The data received or inputted may be the current data or information acquired by the multi-sensor module 120. The control system may be configured to process the data received and transform the data to a treatment strategy. The treatment strategy may include the multiple treatment modes. Consequently, the control signal issued may include the treatment strategy i.e. the multiple treatment modes and the treatment parameters determined.

According to embodiments, the control system 140 may be configured to determine and provide a treatment strategy according to the current data received from the multi-sensor module. The term "treatment strategy" as used herein may be understood as the overall strategy that is the highest hierarchical level of treatment regulation carried out by the ballast water treatment system and is above the treatment modes and treatment parameters. The treatment strategy results from the treatment modes and treatment parameters which in turn are at least partly dependent from the measurements of the ballast water carried out by the online multi-sensor module. The treatment strategy may include multiple treatment modes that may be combined to provide treatment to the ballast water. The treatment strategy may also be understood as a sequence of data provided by the control system. The sequence of data may be executed by hybrid treatment module. Consequently, the treatment strategy may be provided as a program including information about the overall treatment of the ballast water or the components to be depleted in the ballast water.

Advantageously, the control system 140 may include the ballast water quality parameters to determine the treatment strategy. The ballast water quality parameters may give indication of components in the ballast water or characteristics of the ballast water that impair the measurements of the multi-sensor module i.e. the sensors. Consequently, by including the ballast water quality parameters the control system 140 is able to compensate measurement errors. Thus, the control system is able to base the determination of the treatment strategy on rectified data. Furthermore, by measuring the ballast water quality parameters the efficiency of the treatment process may be increased or optimized since the efficiency of the treatment varies with the physical parameters and chemical composition of the ballast water.

The measurement data of the ballast water quality parameters may thus be used to further optimize the determination of the treatment parameters.

According to embodiments described herein, the control system 140 may include an artificial intelligence-based control mechanism. The artificial intelligence-based control mechanism may include machine learning and/or data mining. The artificial intelligence-based control mechanism may include a neuronal network. The neuronal network may include a recurrent neuronal network. The recurrent neuronal network may include historical data. For example, the recurrent neuronal network may include historic measurement data received from the multi-sensor module. According to embodiments, the artificial intelligence-based control mechanism may be trained neuronal network.

According to embodiments described herein, a hybrid treatment module 130 is provided. The hybrid treatment module may be configured to treat the ballast water by executing multiple treatment modes. The hybrid treatment module may include one treatment device 132.

According to embodiments described herein, the hybrid treatment module may include a plurality of treatment devices 132, each of the treatment devices 132 being configured to treat the ballast water by executing at least one respective treatment mode. The ballast water transport line may connect the multi-sensor module and the hybrid treatment module. The ballast water may be transported through the hybrid treatment module. At least one of the plurality of treatment devices 132 may be selected from the group consisting of a chemical treatment module, a physical treatment module e.g. an UV treatment module and a dielectric barrier discharge (DBD) system or combinations thereof.

The plurality of treatment devices may be operated independently, i.e. only one or a few of the plurality of treatment devices may be in operation while the others may be switched off. Equivalently, the hybrid treatment module may include one single treatment device 132. The one treatment device may execute or realize the multiple treatment modes or one treatment mode. The one treatment device 132 may execute one of the multiple treatment modes at a time. The treatment mode may be switched by the control system.

Additionally or alternatively, the ballast water treatment may comprise joint operation of several or even all of the plurality of treatment devices. The operation can be such that a given portion of the ballast water is treated by the several treatment devices, simultaneously, in series and/or in parallel. Thus, "joint operation" may be understood as multiple devices of the same treatment device e.g. multiple UV treatment modules like UV bulbs or multiple DBD reactors may be operated at the same time. The term "joint operation" does, however, not necessitate operation at the same time but may also include merely overlapping, multiplexed or other such operation, as long as a common portion of ballast water is treated by the joint operation.

The terms "treatment" or "treating" as used herein may be understood as the disinfection of ballast water. In more detail, the treatment may include the provision of physical and/or chemical applications to the ballast water to destroy or deplete components in the ballast water e.g. organisms.

According to embodiments, the control system 140 may be configured to regulate the hybrid treatment module, particularly the plurality of treatment devices. The control system may be configured to determine a dosage of treatment and/or may be configured to regulate a power status of the plurality of treatment devices and/or may be configured to regulate a contribution of the plurality of treatment devices to the multiple treatment modes.

The hybrid treatment module may be understood as a system that is able to apply different treatment modes to the ballast water. For example, this may include the combination of the different treatment devices executing the multiple treatment modes or one treatment device configured to execute the multiple treatment modes. A provision of the plurality of treatment devices is beneficial for a directed treatment that may be specifically adapted to the ballast water components to be depleted. For example, an interconnection of plurality of treatment devices may provide a specific treatment for a water-related organism e.g. bacteria.

According to embodiments described herein, the hybrid treatment module may be configured to execute multiple treatment modes of the plurality of treatment modes in parallel. In particular, the plurality of treatment devices may be configured to execute multiple treatment modes in joint operation. The hybrid treatment module may include a plurality of treatment devices. Each of the treatment devices may be configured to treat the ballast water by executing at least one respective treatment mode.

The term "treatment mode" as used herein may be understood as a manner of treatment of the water providing a respective specific treatment effect. The treatment effect is based on a respective (e.g., chemical, physical, and/or physiological) mechanism by which respective target organisms in the water are targeted. Each treatment mode therefore usually uses a different treatment medium (e.g., substance, radiation, heat) for targeting the respective target organism(s) in the water.

A given treatment mode usually requires a specialized corresponding treatment device supplying the corresponding treatment medium. But in some cases a given treatment device can also support a plurality of treatment modes. For example, using the DBD system as an example, one treatment mode could be to provide ozone as active biocide whereas another treatment mode could be to provide $NO_x$. By selecting the operating conditions of the DBD system appropriately (e.g. in this case the repetition frequency of the pulses), the DBD system can be switched between providing ozone or $NO_x$, i.e., between two mechanism targeting organisms in the water in a different manner, and thus between the two corresponding treatment modes. Thus, in this case of a single treatment device supporting multiple treatment modes, a change of treatment mode may be understood as changing the operation of the treatment device so that the treatment device undergoes a qualitative change of treatment effect. This change of treatment effect is different from a mere change of treatment parameters in a situation in which the qualitative treatment effect (i.e., the mechanism by which respective target organisms in the water are targeted) remains the same.

In addition to the above execution of multiple treatment modes, the control system may also adapt respective treatment parameters (e.g., one or more parameters for each of the multiple treatment modes).

The treatment modes may comprise a sequence or combination of treatment events executed by the at least one (e.g., the plurality of) treatment device (132) or by a subset thereof, e.g., one of the plurality of treatment devices (132). The sequence or combination of treatment events provide treatment to the ballast water.

From another perspective, the term "treatment mode" may include a sequence or combination of one or multiple specific treatment effects executed by one or multiple treatment devices. The treatment modes may be executed jointly meaning that multiple treatment effects may occur at the same time carried out by multiple treatment devices and/or by a single treatment device. For example, when the multiple treatment devices execute the multiple treatment events, this may be understood as a combination of treatments based on different treatment effects provided by different treatment devices e.g. a combination of physical treatment and chemical treatment. As a further example, when one treatment device executes the multiple treatment events, this may be understood as changing or adjusting treatment settings to provide different treatment effects by the same treatment device e.g. an ozonation effect at low plasma activity and a $NO_x$ effect at high plasma activity in a DBD system, thereby realizing two treatment modes by the same treatment device.

The term "hybrid" may therefore be understood in the sense that the hybrid treatment module can include more than one treatment mode, e.g., by one treatment device or by a plurality of treatment devices, therefore providing a hybrid treatment.

According to embodiments, the multiple treatment modes may include at least one continuously adjustable treatment parameter. The control system may be configured to regulate the hybrid treatment module by adjusting the treatment parameters, in a continuous manner, according to the water parameters.

A "treatment parameter" as used herein may be understood as a setting or settings which may be altered to adapt operation of the treatment devices for providing a directed treatment to the ballast water (e.g., for varying or adapting the treatment within a given treatment mode). For example, in a DBD system, the treatment parameter may be the voltage applied to the plasma generation device to generate activated species. "Directed treatment" may be understood as a treatment provided to the ballast water that is specifically chosen according to the measurements and analysis of the ballast water to be treated by the online multi-sensor module. The directed treatment may be provided by the treatment devices. The control system may receive the data about the ballast water i.e. the water parameters and may calculate the treatment parameters therefrom. The treatment parameters may then be provided to the plurality of treatment devices by the control system. The treatment parameters may be calculated from the data received from the online multi-sensor module by the control system.

According to embodiments described herein, the multiple treatment modes may include different levels of regulation. The levels of regulation may include inter-regulations of the plurality of treatment devices and intra-regulations of the plurality of treatment devices. Inter-regulations may include the regulation of the plurality of treatment devices with respect to each other (provided that more than one of the one or more treatment device is regulated). Intra-regulations may include the regulation of each of the plurality of treatment devices meaning that e.g. the settings i.e. the treatment parameters of a single treatment device of the plurality of treatment devices are regulated. Accordingly, the regulation of the plurality of treatment devices may occur among the plurality of treatment devices (provided that more than one of the one or more treatment device is regulated) and/or within the plurality of treatment devices. As used herein, the terms "regulate" or "regulation" may be understood as influencing the respective system, module, mode or device such that a desired outcome can be realized.

A non-limiting example is changing the feed gas composition in a DBD system e.g. by altering the humidity in the system, such that the composition of active species is affected. For example, the creation of hydroxyl radicals may be influenced. In general, adaptation of the electrical parameters of such a device can be used to change the composition of active species and adapt them to the organism to be treated.

Additionally or alternatively, the term "treatment mode" may include multiple treatment dosages provided by the plurality of treatment devices. The treatment modes may be established according to the measurements of the multi-sensor module. According to embodiments, the treatment modes may include the alteration of treatment intensity and/or the time of treatment and/or the treatment dosage of the multiple treatment devices of the plurality of treatment devices. These and other factors like e.g. amount of chemicals, chemicals concentration, presence/absence and/or concentration of reactive species and the like may be regulated according to the components present in the ballast water to be depleted. For example, the duration of UV exposure and/or the amount of chemicals used and/or the plasma activity in a DBD system may be regulated.

Additionally or alternatively, the plurality of treatment devices may be switched on or switched off according to the treatment mode provided. As a consequence, one treatment device may be operated while the others of the plurality of treatment devices may be switched off or a few of the plurality of treatment devices may be operated jointly while the others of the one or more treatment device are switched off etc. Accordingly, the treatment mode may for example provide information to the treatment devices about an operation status and/or operation duration and/or operation intensity. The signal for switching on or switching off may be provided by the control system.

Advantageously, the adjustment of the treatment strategy i.e. the interconnection of different treatment devices may lead to an optimized overall treatment. Further advantageously, the generation of disinfection by-products may be prevented or reduced, rendering the need for neutralization redundant. As such, efficiency of the overall treatment process is increased as well as costs are decreased.

According to embodiments described herein, the ballast water treatment system or the online multi-sensor module may include a second online multi-sensor module. The second online multi-sensor module may be similar the online multi-sensor module 120 as described herein. The second online multi-sensor module may be arranged with the ballast water transport line behind the hybrid treatment module for automatically analyzing the one or more water parameters. The second online multi-sensor module may be arranged in the ballast water storage tank. The second online multi-sensor module may provide the data to the control system. Alternatively, the ballast water transport line in front of the online multi-sensor module 120 may include at least one valve for closing the ballast water transport line such that an influx of ballast water to the online multi-sensor module is interrupted. Then, the treated ballast water from the hybrid treatment module may be analyzed after treatment at the online multi-sensor module or at the second online multi-sensor module. Additionally or alternatively, a bypass ballast water transport line may be used to feed the treated water to the online multi-sensor module for analyzing the treated ballast water.

Advantageously, the second online multi-sensor module may provide data to the control system for providing information about the treatment of the ballast water at the hybrid treatment module 130. The data may, for example, be compared to the data generated at the online multi-sensor module 120 arranged in front of the hybrid treatment module. Thus, the efficiency of treatment may be determined.

Furthermore, additional data for the control system, particularly for the artificial intelligence-based control mechanism may be generated.

According to embodiments described herein, the ballast water may be stored in a storage tank 150. The ballast water may remain in the storage tank during a storage time $T_S$. According to embodiments, the ballast water may remain in the ballast water treatment system during retention time $T_R$. The retention time $T_R$ may include the storage time $T_S$. The storage tank 150 may be connected to the hybrid treatment module by the ballast water transport line 107. The storage tank 150 may be connected to the pumping device 105 via the ballast water transport line 107. The ballast water may be transported from the storage tank via the pumping device 105 to the outside of the system 101. Consequently, the ballast water transport line may be a looped line.

According to embodiments, the ballast water may be analyzed more than once during remaining in the ballast water treatment system. The online multi-sensor module 120 or the second online multi-sensor module may be configured to analyze the one or more water parameters more than once during the retention time $T_R$ of the ballast water. Accordingly, further analysis of the water parameters may be carried out. For example, during transporting the ballast water from the storage tank 150 to the outside of the system 101 the water parameters may be analyzed by the online multi-sensor module 120. As a further example, the ballast water treatment parameters may be analyzed in the storage tank 150.

According to embodiments described herein, the ballast water may be treated more than once during the retention time $T_R$ by the hybrid treatment module 130. Thus, components of the ballast water that have not been depleted during the first treatment, may be depleted in a subsequent treatment. Consequently, the ballast water treatment system may be configured to carry out one or more treatment cycles. In particular, the control system 140 may be configured to determine a number of consecutive treatment cycles of the ballast water. The determination of the number of consecutive treatment cycles may be dependent on the further analysis of water parameters. According to embodiments, upper and/or lower thresholds for each water parameter may be set. The control system may be configured to compare the measurement results obtained from the online multi-sensor module to the thresholds. The treatment of the ballast water may be adapted according to the comparison. In particular, the control system may be configured to adapt the treatment strategy according to the comparison.

According to embodiments that can be combined with any embodiment described herein, the components of the ballast water treatment system i.e. the online multi-sensor module, the hybrid treatment module and the storage tank may be arranged in different sequential orders. For example, the online multi-sensor module may be arranged upstream and/or downstream the hybrid treatment module. The storage tank may be arranged upstream and/or downstream of the hybrid treatment module. For example, more than one storage tank may be present. The online multi-sensor module may be arranged in the storage tank. Additionally or alternatively, the sensors of the online multi-sensor module may be arranged upstream and/or downstream the hybrid treatment module and/or the storage tank.

Figure 2:
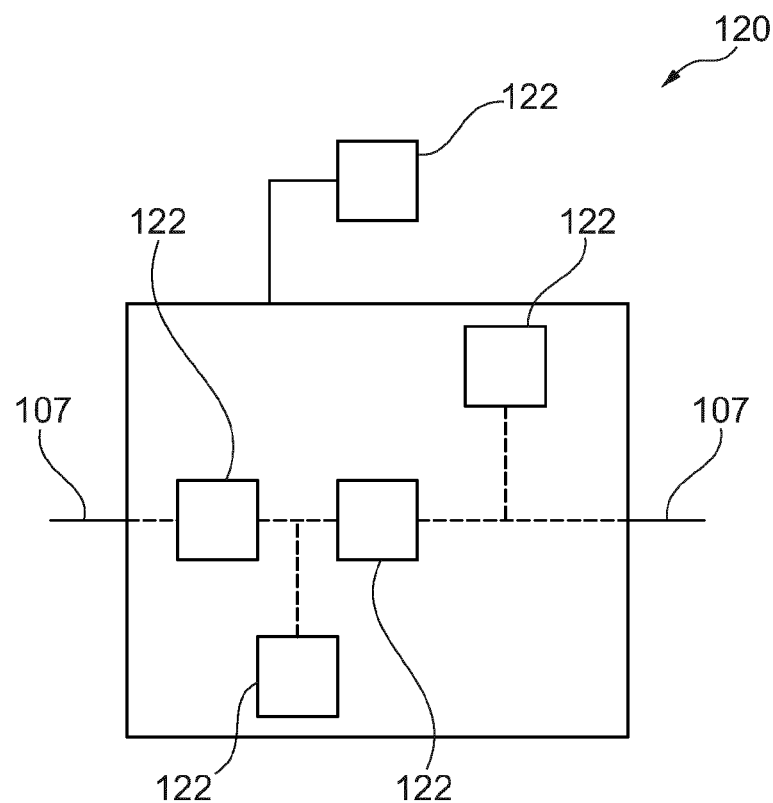
FIG. 2 shows a schematic view of a multi-sensor module according to embodiments described herein.

FIG. 2 shows a schematic view of the online multi-sensor module 120 according to embodiments described herein. The online multi-sensor module 120 or the multi-sensor module may include one or more sensors 122. The one or more sensors may be arranged in the ballast water transport line 107. Additionally or alternatively, a sampling device may be arranged at the ballast water transport line for taking a sample and guiding the sample to one or more sensors 122 being arranged adjacent to the ballast water transport line 107. Alternatively, such offline measurements may be excluded from the invention. The one or more sensors may be arranged in a row. Additionally or alternatively, the one or more sensors may line the inner perimeter of the ballast water transport line. Additionally or alternatively, the one or more sensors may be arranged in the storage tank 150. The term "online" as used herein may be understood as the sensors or the sampling device being arranged with the ballast water transport line, providing an "online" measurement or sampling of the ballast water.

According to embodiments described herein, many different sensors can be used in the multi-sensor module. For example, the one or more sensors may be configured to provide information about general (ballast) water parameters or components including pH, turbidity, salinity, temperature, conductivity, total residual oxidants (TRO), total organic carbon (TOC), particulate organic matter (POM), dissolved organic matter (DOM), and/or mineral matter (MM). These parameters may influence the treatment efficiency. Additionally or alternatively, the water parameters may include organisms as described with respect to FIG. 1.

According to embodiments described herein, the organisms in the ballast water may be identified and quantified. Identification and quantification methods may include fluorometric measurements like e.g. flow cytometry. However, also non-fluorescence methods known by the person skilled in the art may be performed e.g. cell counting with a Neubauer cell chamber etc.

For example, for flow cytometric analysis, the flow cytometer provided by FlowCam® may be used. Generally, flow cytometry is a technique used to detect and measure physical and chemical characteristics of a population of cells or particles. Samples containing cells or particles may e.g. be suspended in a fluid and injected into the flow cytometer instrument. The sample is focused to ideally flow one cell at a time through a laser beam and the light scattered is characteristic to the cells and their components. For example, the online multi-sensor module may be configured to analyze the organisms by an OJIP fluorescence measurement, a dark-adapted chlorophyll fluorescence technique that may be used for cell stress measurement.

According to embodiments described herein, further parameters related to organisms may be analyzed. For example, the amount of cells i.e. the concentration of cells in the ballast water may be analyzed. Furthermore, the amount of dead and/or living cells may be analyzed as well as the viability of the cells.

According to embodiments, a sensor of the online multi-sensor module may be configured to analyze a viability of organisms in the ballast water. As used herein, the term "viability" may be understood as a ratio of living cells in a cell population. For example, the viability may express the amount of living cells compared to the amount of total cells in a population i.e. a sample. The total cell amount may include the amount of living and dead cells. As such, the viability may include the determination of a cell count in a sample where it is possible to distinguish between living and dead cells. The person skilled may understand that an amount of cells may also be measured relatively, e.g. as a concentration. The viability may be regarded as a calculated feature from multiple measurements of the online multi-sensor module.

According to embodiments described herein, the online multi-sensor module may be configured to analyze the organisms in the ballast water. Particularly, the online multi-sensor module may be configured to analyze a physiological health status of the organisms. Organisms, in particular aquatic organisms that are capable of photosynthesis may include the ability of emitting fluorescence when excited at a specific wavelength. The online multi-sensor module may be configured to analyze fluorescence. For example, the online multi-sensor module may include a fluorescence sensor submodule, the fluorescence sensor submodule comprising a light source for illuminating a ballast water sample and a light detector for detecting a light intensity emitted from the ballast water sample for performing a fluorescence-based measurement.

By measuring the emitted fluorescence it is possible to infer to the physiological status of the organism, e.g. to infer to the physiological health status of the organism. The physiological health status may be expressed as the ratio of the difference $F_V$ between the fluorescence intensity under saturated light conditions ($F_M$) and the initial fluorescence intensity ($F_0$) to the fluorescence intensity under saturating light conditions $F_M$. In other words, the $F_V/F_M$-ratio may be a measure for the physiological health status of the organism analyzed. Typically, the higher the ratio, the better the physiological health status.

According to embodiments, the organisms may be analyzed by several techniques. Further examples may be measuring a quantum yield being a measure for the Photosystem II efficiency. In dark adapted samples, this is equivalent to $F_V/F_M$-ratio.

According to embodiments described herein, the organisms analyzed may be identified. Additionally or alternatively, a concentration of the organisms present may be analyzed. Identification of the organisms in the ballast water may include several advantages. For example, the treatment strategy including the settings for the treatment like e.g. treatment duration and dosage may be adapted according to the identified organisms. Furthermore, external data may be specifically used to improve the treatment strategy and/or the treatment modes. The term "external data" as used herein may be understood as any information or data which is not gathered from the measurements of the online-multi sensor modules of the ballast water treatment system. Additionally, by analyzing the concentration of the organisms, it may be possible to verify that the organisms refuse from growing after the treatment and during the retention time $T_R$.

According to embodiments described herein, the multi-sensor module 120 may be configured to analyze the one or more water parameters more than once during a retention time $T_R$ of the ballast water. For example, the one or more water parameters may be analyzed during the storage time $T_S$ of the ballast water in the storage tank. This allows for measurements that are more time-consuming or when sampling of the ballast water is required for analysis. This may further allow to carry out analyses that are time-consuming and complex. In particular, the retention time $T_R$ may be dependent on the voyage time of the ship containing the ballast water treatment system.

Figure 3:
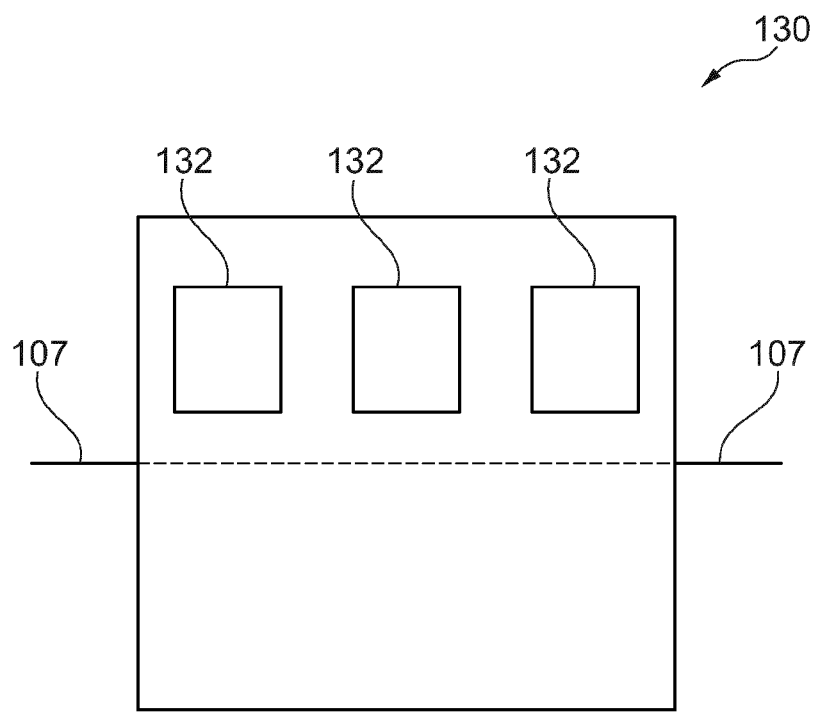
FIG. 3 shows a schematic view of hybrid treatment module according to embodiments described herein.

FIG. 3 shows a schematic view of hybrid treatment module according to embodiments described herein. The hybrid treatment module 130 may include a plurality of treatment devices 132. The ballast water transport line 107 may provide the ballast water to be treated to the hybrid treatment module. The hybrid treatment module may be configured to execute multiple treatment modes jointly. The multiple treatment modes may include the use of the plurality of treatment devices 132. The plurality of treatment devices 132 may be selected from the group consisting of: a chemical treatment module, a physical treatment module and a dielectric barrier discharge system or combinations thereof.

According to embodiments, the plurality of treatment devices may be controlled such that a relative amount of each treatment may be changed. Thus, a different treatment effect on specific organisms may be achieved. For example, one or more treatment devices of the plurality of treatment devices may be interconnected to provide a sequential or simultaneous treatment to the ballast water. Consequently, multiple treatment modes may be provided e.g. by the control system to the hybrid treatment module i.e. to the plurality of treatment devices for treating the ballast water.

According to embodiments, the plurality of treatment devices may include a chemical treatment module. The term "chemical treatment module" as used herein may be understood as a treatment module that may provide chemicals for the depletion of the components in the ballast water like e.g. chlorine, ozone and biocides or derivatives thereof. The chemical treatment module may further include an arrangement for providing the chemicals to the ballast water like e.g. an injection mechanism. The chemicals may be added to the ballast water by e.g. direct or indirect electrolysis.

According to embodiments, the plurality of treatment devices may include physical treatment module. The term "physical treatment module" as used herein may be understood as providing the ballast water with physical interaction for disinfection, e.g. by UV radiation, heat, cavitation, or other suitable means. The physical interaction may be provided by a respective module. For example, the physical treatment module may include an UV treatment module. The UV treatment module may provide a UV light source. The UV treatment module may include one or more tubes, e.g. one or more quartz tubes. The UV light source may be arranged in the one or more tubes. For example, the ballast water may be transported through the one or more tubes and irradiated with UV light provided by the UV light source.

According to embodiments, the plurality of treatment devices may include a non-thermal discharge system, in particular a dielectric barrier discharge (DBD) system. The DBD system may include a plasma generation device. In embodiments, the plasma generation device may include a discharge pipe configured to have a feed gas passed through a feed gas passage. Typically, the discharge area is arranged in the feed gas passage.

For example, a dielectric barrier discharge occurs as a fast-ionizing front mechanism (the 'streamer' regime): An ionization is stimulated by an avalanche of electrons which leads to a distribution of carrier charges by the avalanche. A streamer head having a high charge moves forward inside the generated field. The field is shielded by the streamer head (i.e. the most of the field drops off in the streamer head region) and the streamer moves in the overall field. At the streamer head, the described electron acceleration processes and ionization is taking place. The plasma is generated as a non-equilibrium (non-LTE) plasma.

In other words: the electrical energy of the discharge is primarily transferred to electrons that are elevated in temperature (e. g. to temperatures of more than $10^3$ K), whereas the heavier gas components (atoms, molecules, ions) stay at temperatures close to the ambient temperature of e. g. <400 K. The electrons at the elevated temperature inelastically collide with the heavier gas components. In this collision and subsequent chemical reactions, reactive species i.e.

active oxidants are produced. An active oxidant may, for example, include ozone, but also excited molecules and radicals.

According to embodiments, the discharge pipe can have a cylindrical coaxial geometry, a plate-to-plate geometry or other possible geometries. In an embodiment using the cylindrical coaxial geometry, a discharge pipe has an internal electrode, such as an electrode wire that is on high voltage potential, and an external grounded electrode. The external grounded electrode may be a laminar electrode arranged on a wall of a cylindrical support structure of the discharge pipe. In another embodiment, a discharge pipe has two laminar electrodes, each electrode arranged on the outside of a cylindrical support structure of the discharge pipe. In even another embodiment, the inner electrode can be arranged on the inside of the inner dielectric cylinder leading to a system with two dielectric barriers. The high voltage potential is applied to one of the electrodes. In either embodiment, the cylindrical support structure may be the dielectric involved in the dielectric barrier discharge.

According to embodiments, the discharge pipe may contribute to a simple arrangement in which the treated gas is effectively injected into the ballast water stream. In other words: a treated-gas outlet, or exit of the plasma generation device, is positioned in a proximity of the ballast water stream aimed to be disinfected during the ballast water transportation process.

According to embodiments described herein, the multiple treatment modes may include a sequence or combination of multiple treatment events executed by one treatment device of the plurality of treatment devices. For example, the DBD system may be adapted to provide different types of reactive species i.e. active oxidants that contribute to the disinfection of the ballast water. In other words, the composition of active species may be changed according to different treatment modes applied to the DBD system. The adaptation of the DBD system may occur according to the organisms identified in the ballast water. The generation of different types of reactive species may include the variation or adaptation of different parameters of the DBD system. The parameters of the DBD system that may be varied may be selected from the group consisting of voltage intensity, voltage shape, voltage provision, humidity of the feed gas, discharge characteristics and the like and combinations thereof. For example, by providing different voltage pulses to the plasma generation device, different reactive species may be produced. As a further example, with rising humidity in the feed gas, ozone in the plasma effluent is replaced by hydrogen peroxide and hence the treatment character is changing. It is to be understood that many more parameter settings are conceivable to achieve different reactive species i.e. active oxidants.

Figure 4:
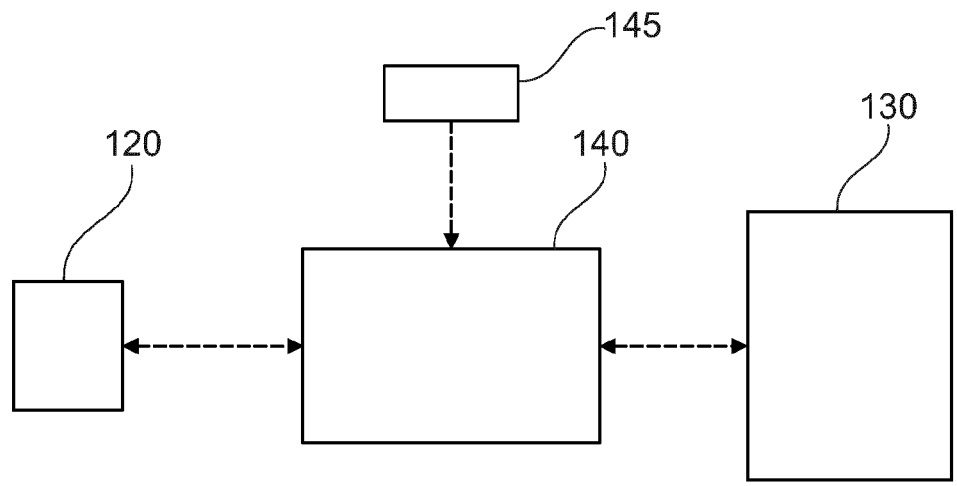
FIG. 4 shows a schematic partial and more detailed view of a ballast water treatment system according to embodiments described herein.

FIG. 4 shows a schematic partial and more detailed view of the ballast water treatment system according to embodiments described herein. The control system may use the data or information received from the multi-sensor module i.e. the sensors to optimize the treatment or the treatment strategy. According to embodiments and taking into account the physiological parameters of the organisms and the general water quality parameters, an optimal treatment strategy may be determined.

According to embodiments described herein, the control system may include an artificial intelligence-based control mechanism. The artificial intelligence-based control mechanism may include a neuronal network, in particular a recurrent neuronal network. Additionally or alternatively, the artificial intelligence based control mechanism may include standard model predictive control algorithms. The control system may be configured to adapt the multiple treatment modes continuously and/or at predetermined time intervals. For example, time intervals may be defined after which the data generated is inputted into the control system. The control system may then adapt the treatment strategy. Alternatively, the generated data may be inputted continuously into the control system to ensure a continuous and stable optimization of the treatment.

According to embodiments, the artificial intelligence-based control mechanism may include machine learning, in particular a learning algorithm, the learning algorithm being configured to process, store and/or combine historical and/or current data from the multi-sensor module. The term "artificial intelligence-based control mechanism" may be understood as a self-improving mechanism where data obtained may be refed to the mechanism for self-improvement.

According to embodiments, the control system may be configured to combine current data received from the multi-sensor module and the external data to optimize the multiple treatment modes. The external data may be received from the group consisting of common databases, organism databases, historic measurements, simulations, experimental data, position data of a ship, (planned) route of a ship, date, time, or combinations thereof. The external data may include information about the organisms identified by the multi-sensor module. The use of external data may include several advantages. For example, the current position of the ship may include information about the ocean environment e.g. common organisms in the current position. The planned route may give information about the retention time $T_R$ which may impact a total treatment duration or may e.g. influence the interconnection of the plurality of treatment devices to accelerate or decelerate the treatment of the ballast water depending on the remaining retention time. Further advantageously, date and/or time may provide information about seasonal changes in e.g. organism concentration and state. These parameters lead to an additional improvement of the treatment strategy and the ballast water treatment.

According to embodiments, the control system may provide the determination of the dosage of the different treatment devices, the switching on and/or off of different treatment devices or the change in the amount of contribution of the plurality of treatment devices to the overall treatment strategy, the change of other parameters influencing the treatment like e.g. the flow rates, the determination of neutralization needs and/or the decision whether additional on-board treatment is necessary. According to embodiments, a decision to treat the ballast water multiple times may be necessary if a single run through the hybrid treatment module is not sufficient for the proper depletion of organisms.

A non-limiting example of the change in the amount of contribution of the plurality of treatment devices to the overall treatment strategy is the addition of hydrogen peroxide ($H_2O_2$) to the ballast water in order to remove or deplete very resistant organisms in an ozonation treatment (combined advanced oxidation treatment). The DBD system may be used to generate reactive oxygen species i.e. ozone radicals that may be used for the treatment of the ballast water. Hydrogen peroxide may be added, enhancing the treatment effect.

Advantageously, the treatment on-board of a ship during the voyage allows to use a more economical, lower sized treatment system. The control system may optimize the treatment instantly (e.g. after a certain retention time) to optimize the treatment effect or result and costs. For example, additional sensor input from further downstream measurements or measurements in the ballast tanks may be used. For example, at least one sensor of the online multi-sensor module may be arranged downstream of the hybrid treatment module to analyze treated ballast water.

According to embodiments described herein, the control system may be configured to regulate the ballast water treatment system. In particular, the control system may regulate different parameters of the ballast water treatment system. For example, the control system may regulate a flow velocity of the ballast water through at least part of the system. Consequently, one or more components of the ballast water treatment system like the pumping device, the online multi-sensor module, the hybrid treatment module and/or the ballast water transport line may be regulated by the control system. Thus, the synergy of the one or more ballast water treatment system components may be improved which leads to an overall optimization of the ballast water treatment.

According to embodiments described herein, the control system may receive data from a second online multi-sensor module positioned at the ballast water transport line behind the hybrid treatment module. Alternatively, the ballast water transport line in front of the online multi-sensor module may include at least one valve for closing the ballast water transport line such that an influx of ballast water from the ballast water source is interrupted. Then, the treated ballast water transported away from the hybrid treatment module may be analyzed after treatment at the online multi-sensor module or at the second online multi-sensor module. The data generated at the online-multi-sensor module or at the second online multi-sensor module may be transferred to the control system. The data generated may be inputted into the control system for data processing.

Figure 5:
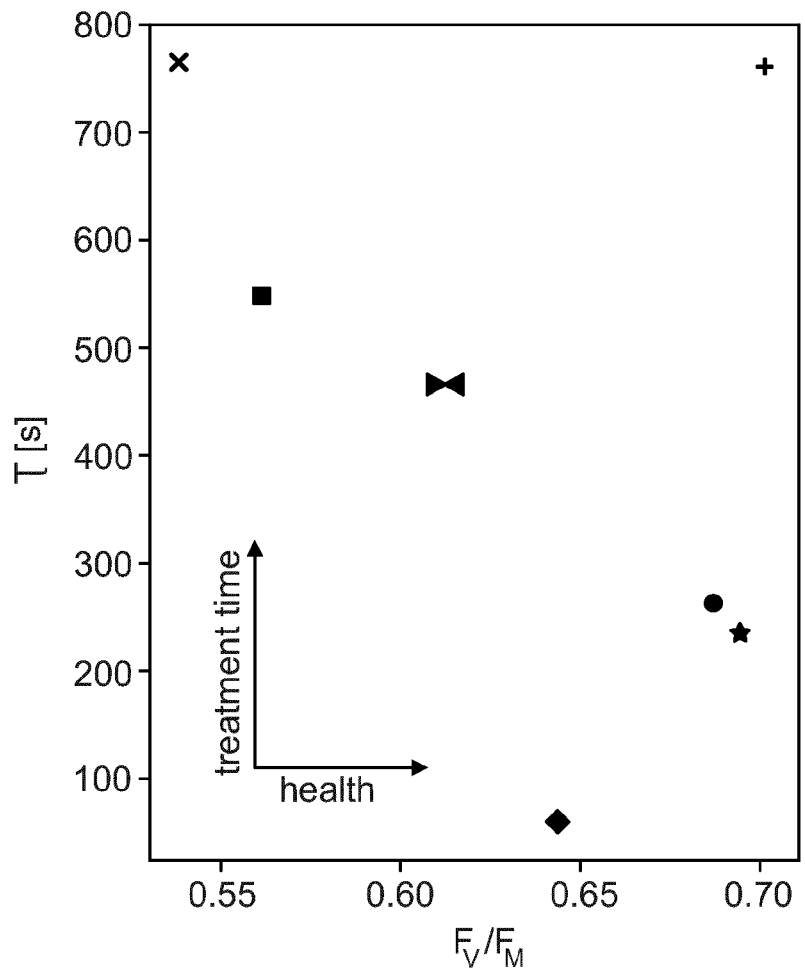
FIG. 5 shows a diagram showing experimental treatment results for a biological species.

FIG. 5 shows a diagram showing experimental treatment results for a biological species. The abscissa shows the $F_V/F_M$-ratio of treated samples containing algae and the ordinate shows the treatment time for a given reduction of the algae concentration. The concentration of algae was similar in all samples to achieve comparability between the samples. The physiological state of the algae (as in nature) varies. Therefore, the efficiency of the treatment was evaluated as function of the cells physiological state.

As to the results of FIG. 5, a marine microalgae organism, *Tetraselmis suecica*, was obtained from the microbiology and parasitology department of the University of Santiago de Compostela (Spain). The algae cultures were maintained at 20-22° C. with constant air flow. The bottles were continuously exposed to a day-light lamp.

The algae suspensions were prepared by inoculating the media (marine (salt) water) with the cells at the desired concentration which was substantially initially similar for all suspensions. The suspensions were treated via dielectric barrier discharge (DBD) at 25 kHz and 12 kV and the treatment time varied for each suspension. About 2.5 ml (in triplicates) of each of the algae suspensions were collected in test tubes. The samples were kept in the dark for 10 minutes. Afterwards, OJIP (fluorescence curve of chlorophyll) was measured by using a fluorimeter (AquaPen-C AP-C 100, Photo Systems Instruments Inc.). Total treatment time varied from 59 seconds to 765 seconds (see FIG. 5). The Fv/Fm parameter (Fv=difference between initial fluorescence immediately after illumination and largest fluorescence Fm at a later stage) in OJIP protocol measures the physiological state (health) of the photosynthetic system in algae cells. It has been experimentally proven by the present inventors that the physiological health status i.e. cell health is a very critical parameter for treatment efficiency. As shown in FIG. 5, at equal algae concentration, higher treatment time is needed when the cell health is lower (up to a factor 8). In other words, to reach the same concentration reduction for less healthy cells, a higher dosage of treatment e.g. a higher dosage of reactive species are needed which may be achieved in the case of a DBD treatment by e.g. altering the voltage or its frequency. It thus could be shown that the evaluation of cell health is an important parameter for an efficient treatment of ballast water.

Advantageously, the specific health status of the organisms contained in the ballast water is useful for adaptation of the ballast water treatment. Thus, a specific treatment may be provided. This may lead to the optimization of the treatment strategy i.e. the multiple treatment modes provided to the plurality of treatment devices. Consequently, the overall treatment process may be adapted according to the analyzed physiological health status.

Further advantageously, knowing the physiological health status the dose or dosage of treatment e.g. the amount of active chemical substances generated for treatment in a DBD system, can be minimized. Since the correlation of the physiological health status of the organisms and the treatment is known, potentially harmful components of the treatment may be reduced or even avoided. As such, neutralization of these harmful components is redundant. Thereby, the efficiency of the treatment process is enhanced or increased. Consequently, the ballast water treatment system includes a beneficial impact on the environment i.e. by reducing the amount of harmful treatment components and by reducing the amount of neutralization compounds. Furthermore, the transport of organisms from one marine environment to another is prevented more efficiently.

Figure 6:
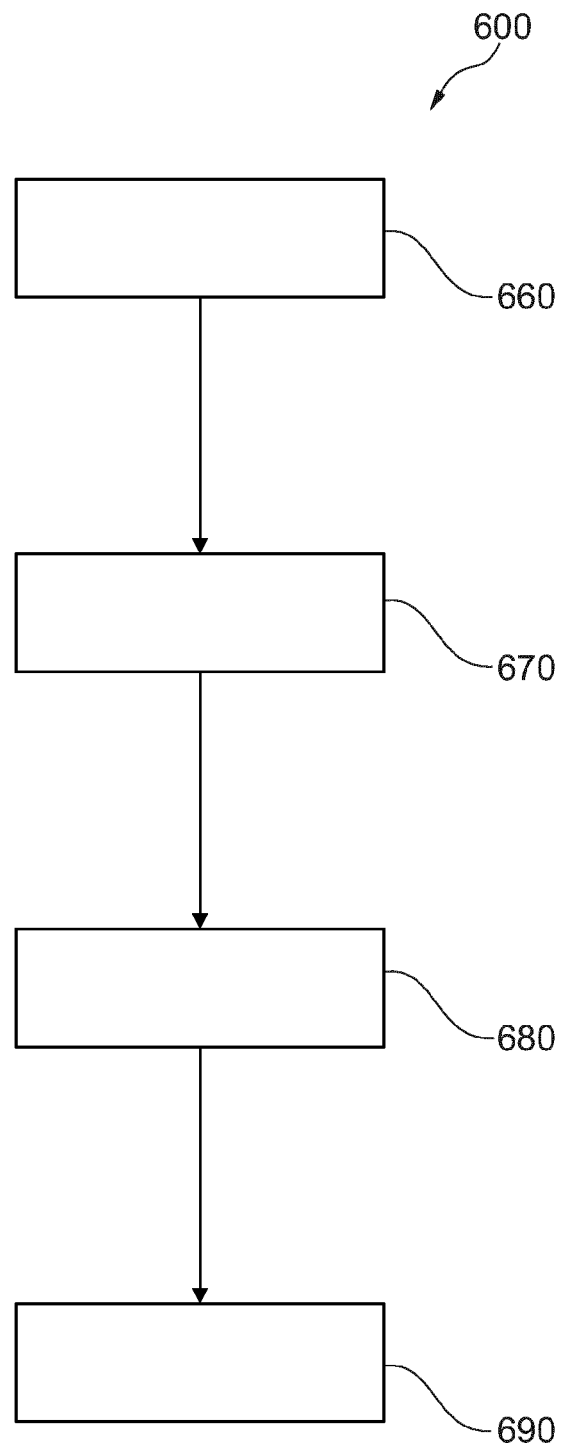
FIG. 6 shows a flow diagram of a method according to embodiments described herein.

FIG. 6 shows a flow diagram of a method according to embodiments described herein. The method may be performed by the ballast water treatment system as described herein. A method 600 for treatment of ballast water is provided. The method includes transporting 660 ballast water through a ballast water transport line, automatically analyzing 670 the ballast water being transported through the ballast water transport line at an online multi-sensor module being connected to the ballast water transport line in an online manner, thereby obtaining one or more water parameters indicative of properties of organisms in the ballast water, treating 680 the ballast water at a hybrid treatment module by executing multiple treatment modes; and regulating 690 the hybrid treatment module by a control system according to the one or more water parameters received from the online multi-sensor module.

According to embodiments, the method may further include transferring the one or more water parameters to a control system. The online multi-sensor module may include one or more sensors for generating the one or more water parameters or current data. The data may be transferred i.e. inputted into the control system. The one or more water parameters or current data may include measurements of water parameters including organisms and ballast water quality parameters. In particular, the data may include information about the physiological health status of the organisms in the ballast water.

According to embodiments, the method may further include determining a treatment strategy by the control system according to receiving the one or more water parameters from the multi-sensor module; and providing the treatment strategy to the hybrid treatment module. The hybrid treatment module may include plurality of treatment devices. The treatment strategy may include a control signal issued to hybrid treatment module. The treatment strategy may include multiple treatment modes provided to plurality of treatment devices.

According to embodiments, the hybrid treatment module may include plurality of treatment devices, and the method may further include regulating a power status of the plurality of treatment devices and/or regulating a contribution of the plurality of treatment devices to multiple treatment modes. Consequently, the multiple treatment modes may include the regulation of the plurality of treatment devices and/or settings of each of the plurality of treatment devices.

The invention claimed is:

1. A water treatment system for marine growth prevention, comprising:
   a water transport line, configured to transport water through the system;
   an online multi-sensor module being connected to the water transport line in an online manner and being configured to automatically analyze the water being transported through the water transport line, thereby obtaining one or more water parameters indicative of properties of organisms in the water;
   a hybrid treatment module, which includes multiple different treatment devices that are configured to treat the water by executing multiple different treatment modes; and
   a control system configured to regulate the hybrid treatment module according to the one or more water parameters received from the online multi-sensor module by determining respective treatment parameters for the multiple treatment modes and issuing a control signal to adjust a treatment effect of at least one of the treatment devices between two mechanisms that target organisms in the water in a different manner according to at least one of the treatment parameters; and
   wherein the treatment parameters provided by the control system comprise commands for activating a selected subset of the multiple treatment modes, the subset being selected according to the one or more water parameters received from the online multi-sensor module.

2. The water treatment system for marine growth prevention according to claim 1, wherein the system is a ballast water treatment system.

3. The water treatment system for marine growth prevention according to claim 1, wherein the online multi-sensor module is configured to automatically analyze at least one physiological parameter of organisms in the water.

4. The water treatment system for marine growth prevention according to claim 1, wherein a sensor of the online multi-sensor module is configured to analyze a viability of organisms in the water.

5. The water treatment system for marine growth prevention according to claim 1, wherein the hybrid treatment module comprises a plurality of treatment devices, each of the treatment devices being configured to treat the water by executing at least one respective treatment mode.

6. The water treatment system for marine growth prevention according to claim 1, wherein the hybrid treatment module comprises a treatment device adapted for treating the water by a plurality of treatment modes, and wherein the control system is configured to regulate the hybrid treatment module according to the one or more water parameters received from the online multi-sensor module by determining a respective treatment mode of the plurality of treatment modes of the treatment device, and to issue a control signal activating operation of the treatment device in the determined treatment mode.

7. The water treatment system for marine growth prevention according to claim 1, wherein the multiple treatment modes comprise at least one continuously adjustable treatment parameter, and wherein the control system is configured to regulate the hybrid treatment module by adjusting the treatment parameter, in a continuous manner, according to the water parameters.

8. The water treatment system for marine growth prevention according to claim 1, wherein at least one of the water parameters is selected from the group consisting of: identity of organisms, quantity of organisms, viability of organisms and a physiological parameter of organisms comprising a physiological health status of organisms.

9. The water treatment system for marine growth prevention according to claim 1, wherein the online multi-sensor module comprises a fluorescence sensor submodule, the fluorescence sensor submodule comprising a light source for illuminating a water sample and a light detector for detecting a light intensity emitted from the water sample for performing a fluorescence-based measurement.

10. The water treatment system for marine growth prevention according to claim 1, wherein the hybrid treatment module is configured to execute the multiple treatment modes jointly.

11. The water treatment system for marine growth prevention according to claim 1, wherein the control system is configured to determine and provide treatment parameters for the multiple treatment modes according to one selected of the group consisting of the ballast water parameters received from the multi-sensor module and external data.

12. The water treatment system for marine growth prevention according to claim 1, wherein the control system is configured to adapt the multiple treatment modes continuously or at predetermined time intervals.

13. The water treatment system for marine growth prevention according to claim 1, wherein the control system is configured to carry out one selected of the group consisting of regulating one of the group consisting of the hybrid treatment module, the plurality of treatment devices, and the multiple treatment modes; determining a dosage of treatment; regulating a power status of the plurality of treatment devices and regulating a contribution of the plurality of treatment devices to the multiple treatment modes.

14. The water treatment system for marine growth prevention according to claim 1, wherein the control system comprises an artificial intelligence based control mechanism, the artificial intelligence based control mechanism comprising a learning algorithm, the learning algorithm being configured to carry out one of processing, storing and combining one selected from the group consisting of historical and current data from the online multi-sensor module.

15. Method for marine growth prevention, the method comprising:
   transporting water through a water transport line;
   automatically analyzing the water being transported through the water transport line at an online multi-sensor module being connected to the water transport line in an online manner, thereby obtaining one or more water parameters indicative of properties of organisms in the water;
   treating the water at a hybrid treatment module by executing multiple treatment modes in multiple different treatment devices; and regulating the hybrid treatment module by a control system according to the one or more water parameters received from the online multi-sensor module, wherein the control system determines respective treatment parameters for the multiple treatment modes based on the water parameters and adjusts a treatment effect of at least one of the treatment devices between two mechanisms that target organisms in the water in a different manner according to at least one of the treatment parameters; and wherein the treatment parameters provided by the control system comprise commands for activating a selected subset of the multiple treatment modes, the subset being selected according to the one or more water parameters received from the online multi-sensor module.

16. The method according to claim 15, wherein the method further comprises:

transferring the one or more water parameters to the control system; and adapting a treatment strategy by the control system according to one selected of the group consisting of the one or more water parameters transferred to the control system and historical data.

17. The method according to claim 15, wherein the water being transported, analyzed and treated is ballast water.

18. The water treatment system for marine growth prevention according to claim 1, wherein at least one sensor of the online multi-sensor module is arranged downstream of the hybrid treatment module to analyze treated water.

* * * * *